(12) United States Patent
Ho et al.

(10) Patent No.: US 11,348,030 B2
(45) Date of Patent: May 31, 2022

(54) SYSTEM AND METHODS FOR DISTRIBUTED MACHINE LEARNING WITH MULTIPLE DATA SOURCES, MULTIPLE PROGRAMMING LANGUAGES OR FRAMEWORKS, AND MULTIPLE DEVICES OR INFRASTRUCTURES

(71) Applicant: Petuum Inc., Pittsburgh, PA (US)

(72) Inventors: Qirong Ho, Pittsburgh, PA (US); Eric Xing, Pittsburgh, PA (US)

(73) Assignee: Petuum Inc., Pittsburgh, PA (US)

( * ) Notice: Subject to any disclaimer, the term of this patent is extended or adjusted under 35 U.S.C. 154(b) by 1197 days.

(21) Appl. No.: 15/849,662

(22) Filed: Dec. 20, 2017

(65) Prior Publication Data

US 2018/0330277 A1 Nov. 15, 2018

Related U.S. Application Data

(60) Provisional application No. 62/504,469, filed on May 10, 2017.

(51) Int. Cl.
| | |
|---|---|
| *G06N 20/00* | (2019.01) |
| *G06F 8/61* | (2018.01) |
| *G06N 5/02* | (2006.01) |
| *G06F 9/46* | (2006.01) |
| *G06N 5/00* | (2006.01) |
| *G06F 8/76* | (2018.01) |

(52) U.S. Cl.
CPC ............. *G06N 20/00* (2019.01); *G06F 8/64* (2013.01); *G06F 9/46* (2013.01); *G06N 5/003* (2013.01); *G06N 5/022* (2013.01); *G06F 8/76* (2013.01)

(58) Field of Classification Search
None
See application file for complete search history.

(56) References Cited

U.S. PATENT DOCUMENTS

| | | | |
|---|---|---|---|
| 10,803,392 B1 * | 10/2020 | Khan | H04L 67/10 |
| 2013/0290223 A1 * | 10/2013 | Chapelle | G06N 20/00 |
| | | | 706/12 |
| 2016/0188207 A1 * | 6/2016 | Choi | G06F 3/0644 |
| | | | 711/153 |

OTHER PUBLICATIONS

Eric P. Xing, "Petuum: A new Platform for Distributed Machine Learning on Big Data", 2015, IEEE (Year: 2015).*

(Continued)

*Primary Examiner* — Lewis A Bullock, Jr.
*Assistant Examiner* — Mark A Gooray
(74) *Attorney, Agent, or Firm* — MagStone Law, LLP; Enshan Hong

(57) ABSTRACT

Methods and systems are presented for consuming different data sources, and deploying artificial intelligence and machine learning programs on different target devices or infrastructures. Many data types can be transformed into machine learning data shards (MLDS) while many machine learning programs written in various programming languages or frameworks are transformed to common operator representations. Operator representations are transformed into execution graphs (EG) for a chosen target device or infrastructure. The MLDS and EG are input to the targeted devices and infrastructures, which then execute the machine learning programs (now transformed to EGs) on the MLDS to produce trained models or predictions with trained models.

14 Claims, 5 Drawing Sheets

(56) References Cited

OTHER PUBLICATIONS

Alekh Agarwal, "A Reliable Effective Terascale Linear Learning System", 2014, Journal of Machine Learning Research (Year: 2014).*

Yuan Yu, "DryadLINQ: A System for General-Purpose Distributed Data-Parallel Computing Using a High Level Language", 2008, OSDI'08: Proceedings of 8th USENIX conference on Operating systems design and implementation (Year: 2008).*

* cited by examiner

SYSTEM AND METHODS FOR DISTRIBUTED MACHINE LEARNING WITH MULTIPLE DATA SOURCES, MULTIPLE PROGRAMMING LANGUAGES OR FRAMEWORKS, AND MULTIPLE DEVICES OR INFRASTRUCTURES

FIELD OF THE INVENTION

The present invention generally relates to a distributed computing system for artificial intelligence (AI) and machine learning (ML) programs written in multiple programming languages or frameworks, and more particularly, is directed to a method of transforming AI and ML programs into common operator representations (OR) for generating execution graphs (EG) for target devices or infrastructures of different computing paradigms (e.g., single laptop, distributed server or Internet of things (IoT) clusters), and further, a method of consuming data sources, such as local or cloud data with different formats, database tables, health records, transaction logs, images and videos, with a standardized interface to facilitate the aforementioned method.

BACKGROUND

Artificial intelligence (AI) and machine learning (ML) applications have become increasingly popular in clouds and enterprise data-centers. AI and ML programs are deployed to address problems in different domains, such as medical diagnosis, vehicle self-driving, risk management, image and video perception, natural language understanding, etc. Each domain may produce data in different formats, such as website feeds, database tables, health records and financial transaction logs, various device (e.g., manufacturing, vehicle, and Internet of things (IoT)) logs with audio, images and videos. The data from these data sources can provide raw data for AI/ML programs.

AI programs are often written in different programming languages, such as Python, Lua and C++, and with different ML frameworks, such as Tensorflow, Caffe and Torch. Each program or framework usually implements common ML algorithms and models. However, each implementation of these algorithms and models has its own characteristics, and often defects, which must be maintained and debugged independently. Moreover, each program or framework may have its own formatting requirements for input data.

AI programs often target a variety of devices or infrastructures of different computing paradigms. For example, AI programs may target devices and infrastructures such as individual workstations and laptops, distributed servers, and IoT clusters, which may be either on-premises or in the cloud. These target devices and infrastructures may have different underlying OS and hardware architectures, such as Linux, Windows, x86 or ARM CPU, NVIDIA or AMD GPU, FPGA, ASIC, Ethernet or InfiniBand etc., and may be used in different scenarios, such as for producing models by training and for inferring predictions using trained models.

Each of the different data sources, different programming languages or frameworks, and different target devices or infrastructures described above contribute to the complexity of deploying AI and ML solutions. Conventional native implementations capable of addressing K number of data sources, L number of programming languages or frameworks, and M number of target devices or infrastructures would result in up to K×L×M implementation combinations, which dramatically increases the cost of the overall system, and is prone to produce inconsistent and non-repeatable results.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a distributed computing system for artificial intelligence (AI) and machine learning (ML) systems, comprising an Omni-Source System (OmSS), an Omni-Lingual System (OmLS), and an Omni-Mount System (OmMS). A Data Identification/Sharding Module (DISM) in the OmSS can receive data, generate a data signature, and divide the data into a number of data pieces. One or more Data Engine Modules (DEM) in the OmSS can transform the data pieces into machine learning data shards by modifying the data pieces based on the data signature. A Database System (DbS) in the OmSS can combine the machine learning data shards into a stored machine learning data shards record. The OmLS can include a parser module (PM) which can receive program code, parse the program code into a program code parse tree, and create an operator representation of the program code. The OmMS can include an Execution Graph Generator Module (EGGM), which can create an execution graph, and create a hardware-specialized execution graph by transforming the execution graph based on target device information received from a user. The hardware-specialized execution graph be sent to the one or more target devices.

Another embodiment is directed to a method of representing data from a plurality of data sources in a consistent format. Data is received from a data source. A data signature can be determined based on data source. The data can be divided into a plurality of data pieces and distributed to a respective data engine machines. Each data machine can transform a respective data piece based on the data signature into a machine learning data shard. Finally, the machine learning data shards from each data engine machine are combined into a machine learning data shards record.

Another embodiment is directed to a method of running a plurality of machine learning programs written in different programming languages on multiple target devices. Target device information and a plurality of machine learning programs are received. A program parse tree can be generated based on the program, and an operator representation of the program can be generated by substituting functions from a mapping table that are found in the program parse tree with corresponding mathematical operators from the mapping table. The operator representation of the program can be converted into an execution graph of the program by generating one or more graph nodes and one or more relationships between the graph nodes. Hardware specifications are loaded based on the target device information, and the execution graph can be transformed into a hardware-specialized execution graph based on the hardware specifications. Finally, the hardware-specialized execution graph is run on the target device.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
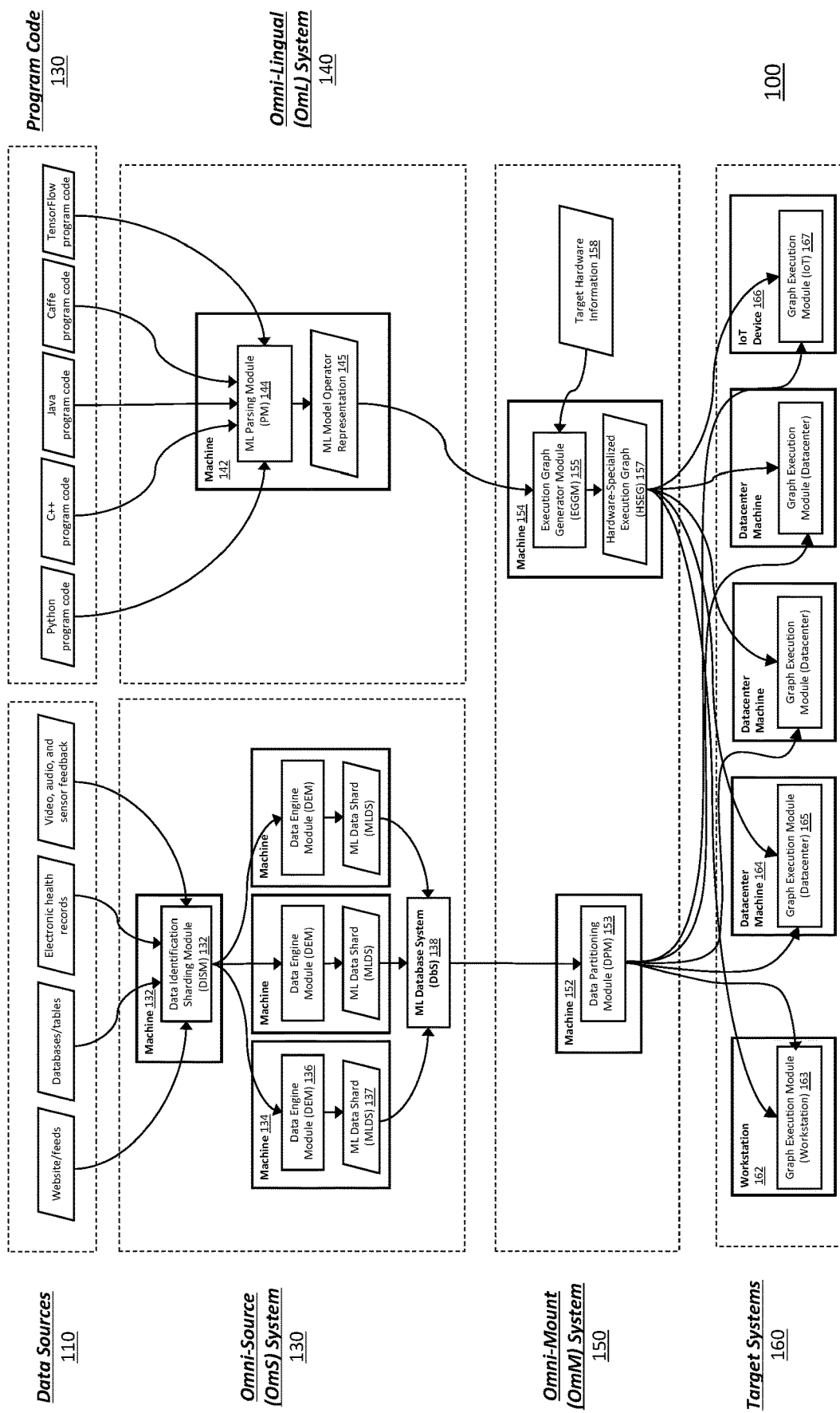
FIG. 1 is a block diagram showing an exemplary distributed computing system including an Omni-Source System (OmSS), an Omni-Lingual System (OmLS), and an Omni-Mount System (OmMS), which can be implemented according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are related to a distributed computing system for enterprise artificial intelligence (AI) programs, where the system is configured to enable a variety of AI programs to consume a variety of data sources, and to generate efficient executables capable of running on a variety of target devices and infrastructures. The inventive system can address K number of data sources, L number of programming languages or frameworks, and M number of target devices or infrastructures, with up to K×L×M implementation combinations, which significantly lowers the cost of the overall system that produces standardized and repeatable results.

FIG. 1 is a block diagram showing an exemplary distributed computing system 100 including an Omni-Source System (OmSS) 130, an Omni-Lingual System (OmLS) 140, and an Omni-Mount System (OmMS) 150, which can be implemented according to embodiments of the invention. Each of the OmSS, OmLS, and OmMS may operate on a separate machine or virtual machine. As a high level summary, the distributed computing system 100 can operate as follows: (1) the OmSS 130 converts data from a variety of data sources 110 into machine data learning shards (MLDS) 137, which are then stored in an ML Database System (DbS) 138; (2) the OmLS 140 converts ML programs 130 having a variety of programming languages into operator representations 145 (also referred to as ML model operator representations) of the program code; and (3) the OmMS receives the stored MLDS 137 and operator representations of the ML program 130, converts the ML operator representations 145 into a hardware-specialized execution graphs (HSEG) 157, and distributes the MLDS and HSEG to a variety of target systems and infrastructures 160. A detailed description of the computing system 100 and its operation is given below.

As illustrated in FIG. 1, the Omni-Source System (OmSS) 130 is configured to receive data from a variety of data sources 110, which may include (but are not limited to) websites or web feeds, databases or tables, records such as electronic health records, and video, audio, and sensor feedback. The OmSS 130 may operate in batch mode, where the data source already contains all needed data, and streaming mode, where the data from the data source 110 is generated and received by the OmSS in real time.

The OmSS 130 first reads the data from the data source 110 through a Data Identification/Sharding Module (DISM) 132, which computes a data signature based on the data source. This data signature identifies the type of data (website, table, etc.) contained in the data source. In some examples, the data signature may be computed based on the characteristics of the data, while in other examples, the data signature may be computed based on an input provided by a user. Once the data signature is computed, the data from the data source 110 is then evenly divided into P pieces, and distributed to P machines (e.g., machine 134) along with the data signature. Each of the P machines may include a Data Engine Module (DEM) 136 that converts a respective piece of the data to an ML Data Shard (MLDS) 137 by applying a filter, the filter being chosen based on the data signature. The MLDS 137 (e.g., the D-dimensional vectors) are then sent to the ML Data Database System (DbS) 138, which combines or concatenates the respective MLDS 137 from each of the DEM machines 134 and stores them for later use. This stored combination of individual MLDS 137 is referred to throughout the present disclosure as an MLDS record. In some examples, an MLDS record is an N-by-D matrix where each of the N rows is a D-dimensional vector that represents a single datum, such as the text from a webpage, a single frame of video, or a single patient's electronic health record.

Figure 2:
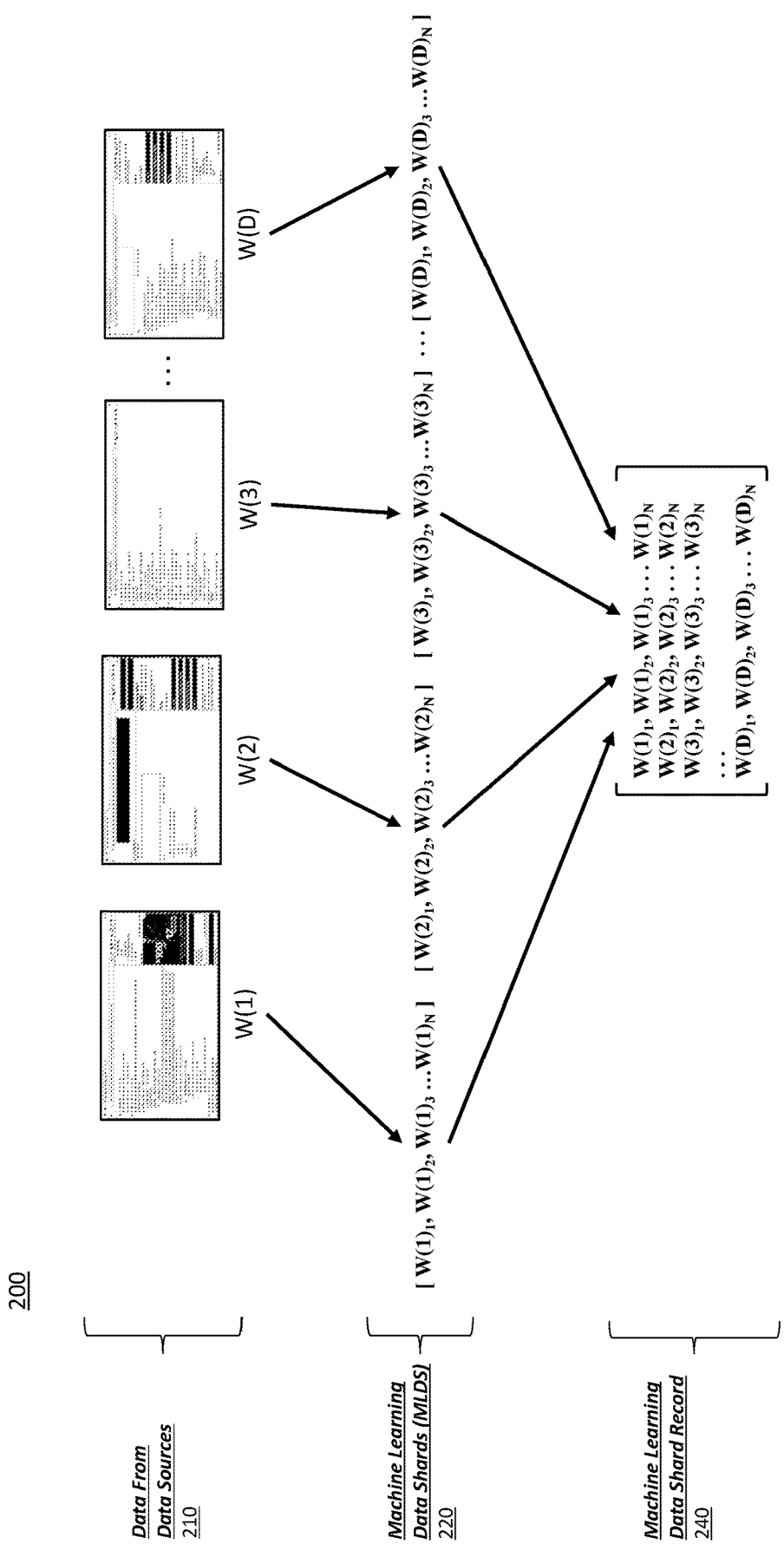
FIG. 2 presents an exemplary process of converting example data from a data source into machine learning data shards, and further into a machine learning data shards record according to embodiments of the invention.

FIG. 2 illustrates an example process of converting data from a data source 210 into machine learning data shards 220, and further into a machine learning data shards record 240. In the example shown in FIG. 2, the data from data sources 210 includes individual webpages from W(1) to W(N). In this example, if the data signature corresponds to "webpages", the DEM (e.g., DEM 136) can, for example, apply a TF-IDF (Term Frequency, Inverse Document Frequency) filter to transform each webpage W(1)-W(N) into MLDS 220, where the MLDS is in the form of a D-dimensional vector. As shown, the MLDS 220 (e.g., D-dimensional vectors) are then sent to the ML Database System (DbS) 138, which combines the respective MLDS 137 from each of the DEM machines 136 into an MLDS record 240 having the form of an N-by-D matrix, which is stored for later use.

Referring back to FIG. 1, in order to handle a variety of data signatures, the DEM 136 may be pre-programmed with a library of filters that are known in the art (such as TF-IDF, Principal Component Analysis, etc.), which may be selected based on the data signature. In addition, in some configurations, the library of filters in the DEM 136 may be capable of being updated by a user in order to add additional filters to the system.

As also shown in FIG. 1, the Omni-Lingual System (OmLS) 140 can convert ML program 130 written in different programming languages using different frameworks into an ML operator representation 145. Examples of programming languages capable of being received by the OmLS 140 include Python, C++, and Java, and example ML frameworks include TensorFlow and Caffe. In one embodiment, a Parser Module (PM) 144 in the OmLS 140 is responsible for converting ML programs 130 written in various programming languages, into an ML operator representation 145. In these configurations, the PM 144 can contain a mapping table for each supported programming language. The mapping table can have two columns: the first column containing functions or patterns from the supported language, and the second column containing that function or pattern's corresponding mathematical operator. When the PM 144 is input with an ML program 130, it loads the mapping table corresponding to the programming language that the ML program is written in. The PM 144 can use standard compiler parsing techniques to generate a parse tree from the ML program 130. The PM 144 can then sweep over every element of the parse tree, substituting all functions or patterns that match the first column of the mapping table with their corresponding operator in the second column. In some configurations, all elements of the parse tree that did not match the first column are discarded. The end result is a parse tree of operators, which is referred to herein as the ML operator representation 145 of the ML program 130.

The Omni-Mount System (OmMS) 130 shown in FIG. 1 includes a machine 142 which converts the ML operator representation 145 of the ML program 130 into a hardware-specialized execution graph (HSEG) 157, which can be run on a variety of target systems 160. Target systems 160 may include a variety of devices or infrastructures of different computing paradigms, including (but not limited to) workstations (e.g., workstation 162 shown), a datacenter machine (e.g., datacenter machine 164), or an Internet of Things (IoT) device, (e.g., IoT device 166 shown). In some embodiments, machine 154 includes an Execution Graph Generator Module (EGGM) 155, which receives the ML operator representation 145 from the Parsing Module (PM) 144 along with target hardware information 158. In some cases, the target hardware information 158 may be computed based on detected characteristics of target systems 160, while in other cases, the target hardware information may be provided by a user. The EGGM 155 is configured to create an execution graph by generating one or more graph nodes and graph node relationships based on the ML operator representation 145. In some embodiments, the execution graph may be transformed or refined to create a hardware-specialized execution graph (HSEG) 157 based on the target hardware information 158. In some embodiments, transforming the execution graph into a HSEG can include partitioning the execution graph such that the HSEG is configured to run in parallel on one or more target systems 160. The conversion from the ML operator representation 145 into the HSEG 157 is explained in more detail below with reference to the example shown in FIG. 3.

Once created, the HSEG 157 is sent by the EGGM 155 in the OmMS 150 to one or more target systems 160. In some embodiments, the EGGM 155 may be further configured to create hardware-specialized executables (also referred to as graph execution modules) based on the target hardware information, which enable a hardware-specialized execution graph 157 to run on a specific target system. For example, the EGGM 155 may be configured to generate and send a workstation graph execution module 163 to a workstation 162, a datacenter graph execution module 165 to a datacenter machine 164, an IoT graph execution module 167 to an IoT device 166, and so on.

In some embodiments, the OmMS 150 can also include a machine 152 having a Data Partitioning Module (DPM) 153 configured to retrieve the MLDS 137 from the OmMS (e.g., a MLDS record from the ML Database System (DbS) 138), partition the MLDS into a plurality of MLDS pieces, and distribute the MLDS pieces to the one or more target systems 160. In this way, the OmMS 150 can match specific MLDS pieces to suitable target systems 160, for example, based on the data signature.

Figure 3:
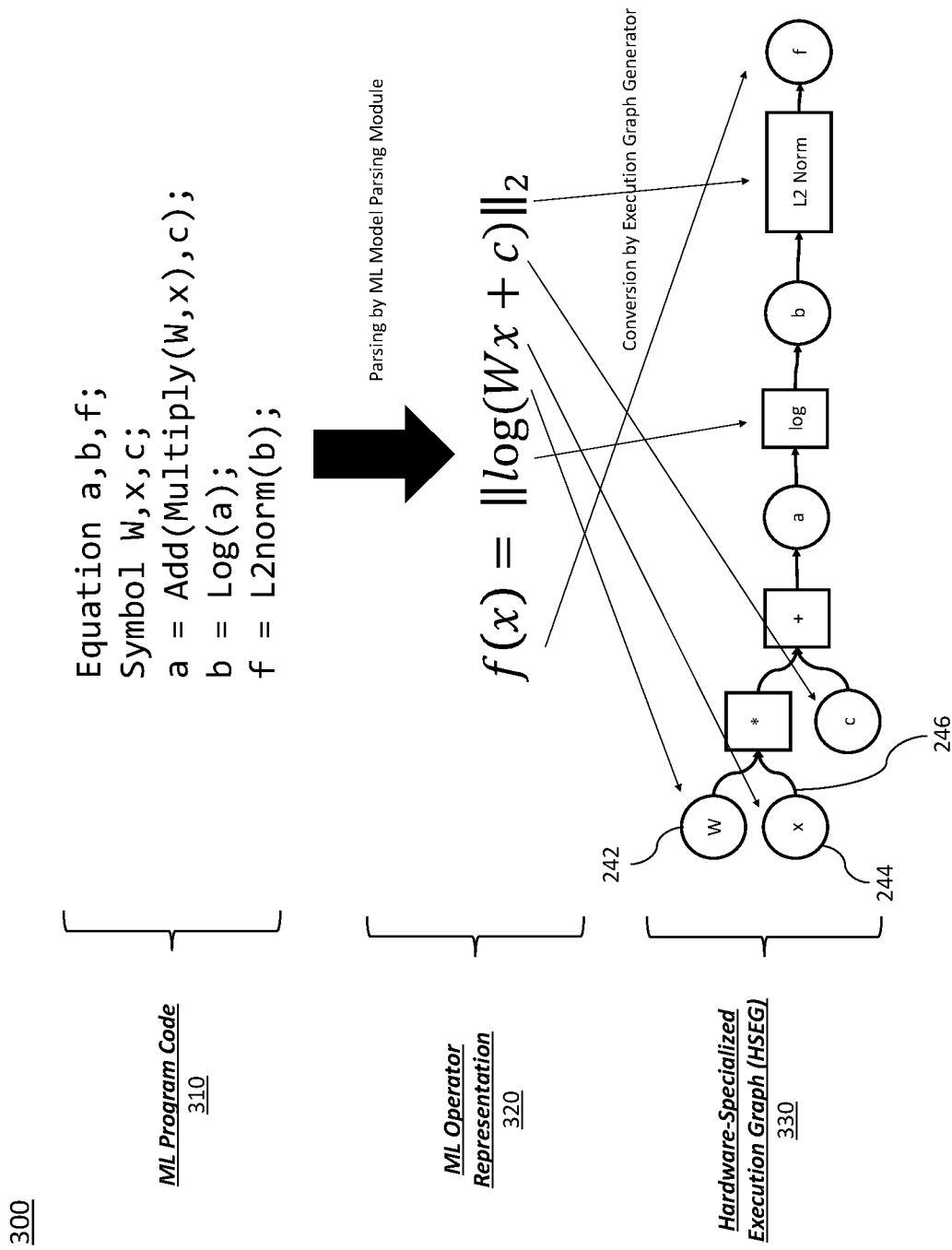
FIG. 3 presents an exemplary process of converting example ML program code into an ML operator representation, and further, into an execution graph according to embodiments of the invention.

FIG. 3 illustrates an exemplary process 300 of converting example ML program code 310 into an example ML operator representation 320, and further, into an example hardware-specific execution graph 330 according to embodiments of the invention. As shown, the example program code 310 creates three "Equation" objects "a," "b," and "f," which incorporate three "Symbol" objects "W," "x," and "c." Example program code 310 may correspond, for example, to program code of ML programs 130 discussed with reference to FIG. 1 above. As shown in FIG. 3, the example program code 310 is converted into an ML operator representation 320 using, for example, the Parsing Module (PM) 144 in the OmLS 140 discussed above. Next, the ML operator representation 145 is converted to an execution graph, for example, using the Execution Graph Generator Module (EGGM) 155 in the OmMS 150 shown in FIG. 1. Although not shown in FIG. 3, the execution graph may have a form similar to that of the hardware-specialized execution graph 330 shown, where symbols and functions are mapped to graph nodes (e.g., symbol W to node 242 and symbol x to node 244) and their relationships are mapped to graph node relationships (e.g., relationship 246).

As discussed with reference to FIG. 1 above, depending on the hardware specifications of a target device or computing paradigm (e.g., x86 or ARM CPU, GPU, Ethernet, InfiniBand), the execution graph may be transformed in order to create a hardware-specialized execution graph 330, for example, using the EGGM 155 in FIG. 1. In some cases, transforming the execution graph into a hardware-specialized execution graph includes limiting certain symbols or functions according to one or more device limitations specified in the target hardware information (e.g., target hardware information 158 in FIG. 1). For example, given an embedded system, the OmMS may specify that the mathematical symbols W and x be restricted to 16-bit floating point storage or quantized to 8-bit integer storage, in order to match the embedded CPU's capabilities. In another example, given a datacenter, the OmMS may specify that the EG is to be partitioned across different machines using a standard graph partitioning algorithm such as METIS, in order to exploit parallelism opportunities. In some embodiments, the execution graph (not shown) is not modified or transformed, and thus, the hardware-specialized execution graph 330 is essentially the same as the execution graph.

Figure 4:
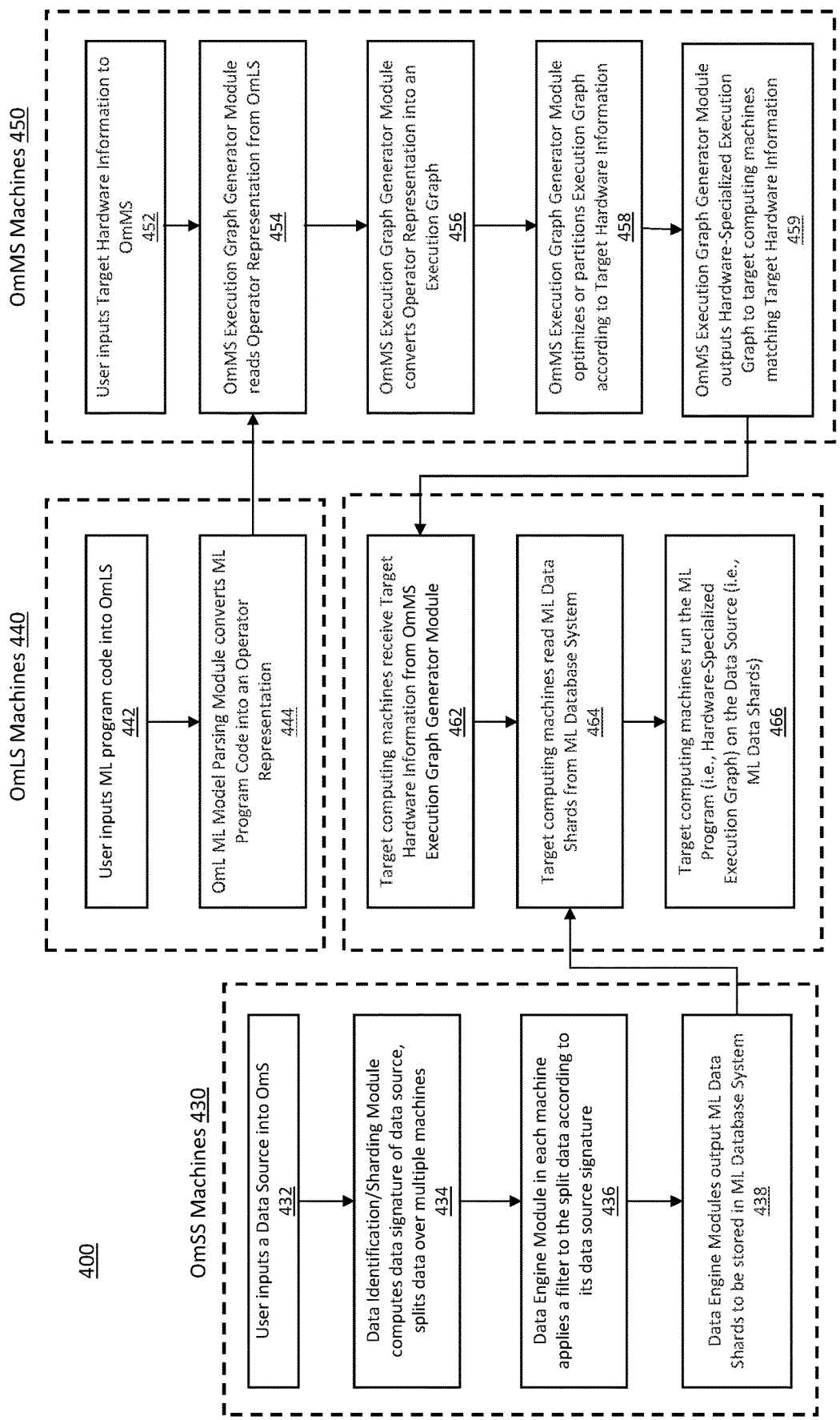
FIG. 4 is an exemplary algorithm of processing a programming request according to embodiments of the invention.

FIG. 4 is an exemplary algorithm 400 of processing a programming request according to embodiments of the invention. The components discussed with reference to FIG. 4 may correspond, for example, to those same components shown in FIG. 1. In step 432, a user inputs data from a data source into the Omni-Source System (OmSS). At step 434, a Data Identification/Sharding Module (DISM) computes a data signature of the data source, and splits the data over multiple machines. At step 436, a Data Engine Module (DEM) in each machine applies a filter to the split data according to its data source signature. At step 438, the Data Engine Modules output ML Data Shards (MLDS) to be stored in an ML Database System (DbS). As indicated in FIG. 4, steps 432-438 can be performed by the OmSS machines 430.

At step 442, a user inputs ML program code to the Omni-Lingual System (OmLS). At step 444, the OmLS ML Parsing Module (PM) converts ML program code into an ML operator representation. As indicated in FIG. 4, steps 442-444 can be performed by the OmLS machines 440.

At step 452, a user inputs target hardware information to the Omni-Mount System (OmMS). At step 454, an Execution Graph Generator Module (EGGM) reads the ML operator representation from the OmLS. At step 456, the EGGM converts the operator representation into an execution graph. At step 458, EGGM optimizes or partitions the execution graph according to target hardware information. At step 459, EGGM outputs a hardware-specialized execution graph to target computing machines matching the target hardware information. As indicated in FIG. 4, steps 452-459 can be performed by the OmMS machines 450.

At step 462, target computing machines receive target hardware information from EGGM in the OmSS. At step 464, target computing machines read MLDS from ML DbS in the OmSS. At step 466, target computing machines may now run the ML program, now converted to a hardware-specialized execution graph, on the data source, now converted to ML data shards. As indicated in FIG. 4, steps 462-466 can be performed by target machines 460.

Figure 5:
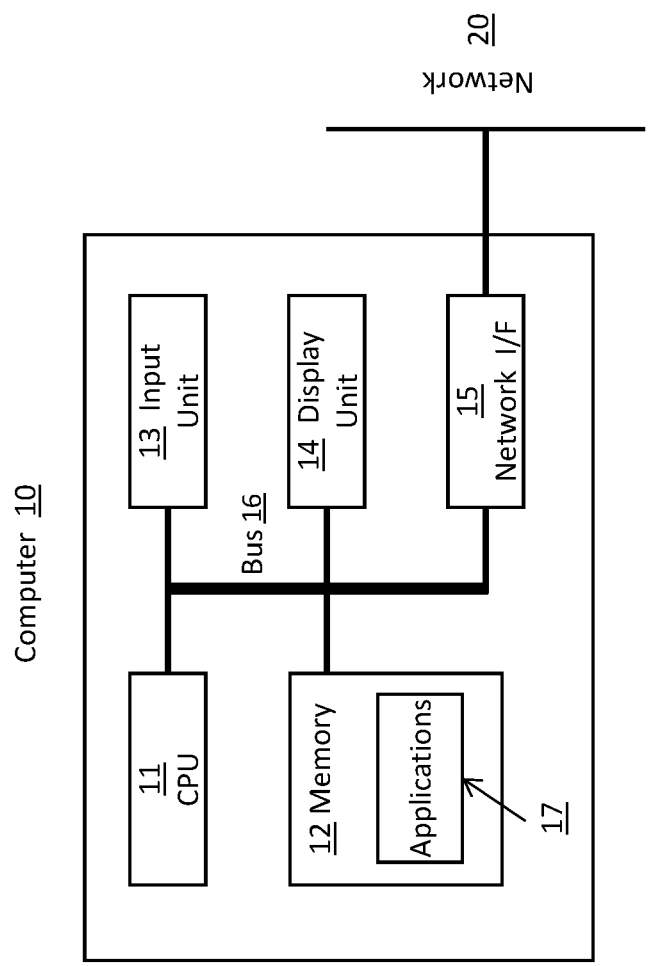
FIG. 5 is a block diagram illustrating configurations of a computer in which embodiments of the invention can be implemented.

FIG. 5 is a block diagram illustrating configurations of a computer 10 in which embodiments of the invention can be implemented. Computer 10 can perform any of the methods described with reference to FIGS. 1-4 above. Computer 10 can include one or more processors (CPU) 11, storage (memory) 12, an input unit 13, display unit 14, and network interface (I/F) 15 configured to interface with a network 20. These components may interface one with another via a bus 16. Applications 17 may be stored on memory 12 and may include data and instructions for performing any of the methods described in this disclosure, including those described with reference to FIGS. 1-4.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A distributed computing system for artificial intelligence and machine learning systems, comprising:
   an Omni-Source System (OmSS) including:
      a Data Identification/Sharding Module (DISM) configured to receive data, generate a data signature based on a source of the data, and divide the data into a number of data pieces;
      one or more Data Engine Modules (DEM) configured to receive the data signature, receive the data pieces, and transform the data pieces into machine learning data shards by modifying the data pieces based on the data signature using a filter chosen based on the data signature based on the source of the data;
      a Database System (DbS) configured to receive the machine learning data shards from the DEM, combine the machine learning data shards into a machine learning data shards record, and store the machine learning data shard record for later use;
   an Omni-Lingual System (OmLS) including:
      a parser module (PM) configured to receive program code from a program code source, determine a programming language of the program code and a mapping table for the determined programming language that maps functions or patterns to mathematical operators, parse the program code into a program code parse tree, and create an operator representation of the program code by substituting elements in the program code parse tree with one or more corresponding mathematical operators based on the mapping table; and
   an Omni-Mount System (OmMS) including:
      an Execution Graph Generator Module (EGGM) configured to receive the operator representation of the program code from the PM, receive, from a user, target device information about one or more target devices, determine hardware specifications based on the target device information, create an execution graph by generating one or more graph nodes and one or more relationships between the graph nodes, create a hardware-specialized execution graph by transforming the execution graph based on the target device information, and send the hardware-specialized execution graph to the one or more target devices;
   the one or more target devices including:
      a target device of the one or more target devices for, receiving the hardware-specialized execution graph, reading the ML data shards from the DBs; and executing the hardware-specialized execution graph on the ML data shards.

2. The computing system of claim 1, wherein the OmMS further includes:
   a Data Partitioning Module (DPM) configured to retrieve the stored machine learning data shard record from the DSM in the OmSS, partition the machine learning data shard record into a plurality of machine learning data shard record pieces, and distribute the machine learning data shard record pieces to the one or more target devices.

3. The computing system of claim 1, wherein the DISM, DEM, PM, and EGGM are each running on a different machine.

4. The computing system of claim 1, wherein the DEM in the OmSS modifies the data pieces using one or more filters, and wherein the one or more filters are selected from a library of filters based on the data signature, and wherein the library of filters is configured to be updated by a user.

5. The computing system of claim 4, wherein the library of filters includes at least one of TF-IDF filter and a principal component analysis filter.

6. The computing system of claim 1, wherein:
   in the EGGM of the OmMS, transforming the execution graph into the hardware-specialized execution graph includes partitioning the execution graph such that the hardware-specialized execution graph is configured to run in parallel on the one or more target devices.

7. The computing system of claim 1, wherein:
   in the EGGM of the OmMS, transforming the execution graph into the hardware-specialized execution graph includes specifying that a graph node of the one or more graph nodes be limited to a specific data type and a specific bit-size.

8. The computing system of claim 1, wherein:
   the DISM in the OmSS is configured to generate data signatures for a website, a table, an electronic health record, a video, and an audio clip;
   the PM in the OmLS is configured to determine programming languages for Python, C++, and Java; and the EGGM in the OmMS is configured to create hardware-specialized execution graphs for target devices with Linux, Windows, x86, ARM CPU, NVIDIA, AMD GPU, FPGA, ASIC, Ethernet, and InfiniBand architectures.

9. The computing system of claim 1, wherein the OmMS is further configured to create one or more hardware-specialized executables based on the target device information and send each hardware-specialized executable to a respective target device of the one or more target devices.

10. A method of running a plurality of machine learning programs written in different programming languages on multiple target devices using a distributed computing system having an Omni-Source System (OmSS) having a Data Identification/Sharding Module (DISM), Data Engine Modules (DEM) and a Database System (Dbs), an Omni-Lingual System (OmLS) having a parser module (PM), and an Omni-Mount System (OmMs) having an Execution Graph Generator Module (EGGM), wherein the method comprising:

receiving data at the DISM, and in response to the receiving the data, the DISM generates a data signature based on a source of the data, and divides the data into a number of data pieces;

receiving at one or more DEM's, the data signature and the data pieces, and in response to the receiving the data signature and the data pieces, the DEM transforms the data pieces into machine learning data shards by modifying the data pieces based on the data signature and using a filter chosen based on the data signature based on the source of the data;

receiving at the Dbs, the machine learning data shards from the DEM, and in response to the receiving the machine learning data shards, the Dbs combines the machine learning data shards into a machine learning data shards record, and stores the machine learning data shard record for later use;

receiving at the PM, program code from a program code source, and in response to the receiving the program code, the PM determines a programming language of the program code and a mapping table for the determined programming language that maps functions or patterns to mathematical operators, parses the program code into a program code parse tree, and creates an operator representation of the program code by substituting elements in the program code parse tree with one or more corresponding mathematical operations based on the mapping table;

receiving at the EGGM, the operator representation of the program code from the PM and receiving from a user, target device information about one or more target devices, and in response to receiving the operator representation and the target device information, the EGGM determines hardware specifications based on the target device information, creates an execution graph by generating one or more graph nodes and one or more relationships between the graph nodes, creates a hardware-specialized execution graph by transforming the execution graph based on the target device information, and sends the hardware-specialized execution graph to the one or more target devices;

receiving at the one or more target devices the hardware-specialized execution graph, and in response to receiving the hardware-specialized execution graph, the one or more target devices reads the ML data shards from the Dbs, and executes the hardware-specialized execution graph on the ML data shards.

11. The method of claim 10 further comprising:

creating one or more hardware-specialized executables based on the hardware specifications; and sending each hardware-specialized executable to a respective target device of the one or more target devices, wherein running the hardware-specialized execution graph on the target device includes running one of the one or more hardware-specialized executables.

12. The method of claim 10 further comprising:

while transforming the execution graph into the hardware-specialized execution graph, partitioning the execution graph; and in addition to running the hardware-specialized execution graph on the target device, running the hardware-specialized execution graph in parallel on one or more other target devices of the one or more target devices.

13. The method of claim 10, wherein transforming the execution graph into the hardware-specialized execution graph includes specifying that a graph node of the one or more graph nodes be limited to a specific data type and a specific bit-size.

14. The method of claim 10, wherein generating the operator representation of the program further includes discarding any elements in the program parse tree which are not found in the mapping table.

* * * * *